United States Patent
Rose

(10) Patent No.: US 6,578,143 B1
(45) Date of Patent: *Jun. 10, 2003

(54) METHOD FOR NEGOTIATING WEAKENED KEYS IN ENCRYPTION SYSTEMS

(75) Inventor: Gregory G. Rose, Mortlake (AU)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,348

(22) Filed: Dec. 18, 1998

(51) Int. Cl.$^7$ ................................ G06F 1/26
(52) U.S. Cl. .................. 713/164; 713/165; 713/168
(58) Field of Search ................ 713/164, 165, 713/166, 168

(56) References Cited

U.S. PATENT DOCUMENTS

| | | | |
|---|---|---|---|
| 5,323,464 A | 6/1994 | Elander et al. | 380/24 |
| 5,689,565 A | 11/1997 | Spies et al. | 380/25 |
| 5,764,772 A | 6/1998 | Kaufman et al. | 380/30 |
| 5,838,962 A | * 11/1998 | Larson | 712/239 |

FOREIGN PATENT DOCUMENTS

WO  9705720  2/1997

* cited by examiner

*Primary Examiner*—Thomas R. Peeso
(74) *Attorney, Agent, or Firm*—Philip R. Wadsworth; Charles D. Brown; Kyong H. Macek

(57) ABSTRACT

A method for permitting encrypted communications between two stations which are operable with encryption algorithms that accept encryption keys having work factors with different values, by: in a first determining step, determining the lower one of the different values; providing an initial encryption key having a first work factor value; comparing the first work factor value with the lower one of the work factors determined in the determining step; when, in the comparing step, the first work factor value is greater than the lower one of the work factor values determined in the determining step, performing the following steps: performing a first hash function on the initial encryption key to produce a first output, and deriving from the first output a first intermediate key having a work factor value not greater than the lower one of the different work factor values determined in the determining step; performing the first hash function on the first intermediate key to produce a second output, and deriving from the second output a final encryption key having a work factor value not greater than the lower one of the different work factor values determined in the determining step; and using the final encryption key to encrypt communications between the two stations; and when, in the comparing step, the first work factor value is found to not be greater than the lower one of the work factor values determined in the determining step, using the initial encryption key to encrypt communications between the two stations.

12 Claims, 2 Drawing Sheets

METHOD FOR NEGOTIATING WEAKENED KEYS IN ENCRYPTION SYSTEMS

BACKGROUND OF THE INVENTION

The present invention relates to the encryption of wireless communication signals, and relates in particular to the communication between systems having different encryption requirements. It has become commonplace to transmit messages, in the form of digital data, via wireless communication systems and/or the Internet.

Two general types of cryptography are secret key cryptography and public key cryptography. In the case of secret key cryptography, a message, often referred to as "plaintext", to be transmitted from a sender to an intended recipient is encrypted using a secret key and the intended recipient decrypts the encrypted message, frequently referred to as a "ciphertext" or a "cryptogram", using the same secret key. Only the secret key may be used to encrypt and decrypt the message and attempts made to decrypt the message with other keys will fail. A widely used secret key system is the Data Encryption Standard (DES) which employs a 56 bit key and 8 non-key parity bits. DES was published as a U.S. Federal Information Processing Standard in 1977.

The present invention is directed essentially to secret key cryptography.

The degree of security provided by a given encryption system depends on the strength, or work factor, of the system, which is commonly measured in terms of the number of bits in the key.

A work factor is a number, expressed in bits, which is the logarithm to base 2 of the maximum number of basic decryption operations which must be performed, using different trial keys, to determine with certainty which trial key corresponds to the actual key that was used for encryption. For example, the DES Algorithm has a work factor of 56 bits because it provides a key with $2^{56}$ possible values. As is known in the art, any trial key may be the correct key. Therefore, the correct key will usually be found after fewer than $2^{56}$ trials. On average, the correct key will be found after half of the possible trial key values have been tested. However, it is common practice to base the work factor on the maximum number of possible key values and this provides a valid basis for comparison of different work factors.

Thus, for example, in a secret key encryption system, a key which is three bytes long, i.e., consists of 24 bits, can be broken relatively easily by trying all $2^{24}$ possible keys until comprehensible plaintext is obtained. This technique is one form of what is sometimes referred to as a "brute force attack" or "exhaustive cryptoanalysis". The larger the number of bits in a key, the greater will be its strength. It is presently believed that, for example, a 128 bit key for a secret encryption algorithm will be completely unbreakable, at least by the brute force method.

The work factor of an encryption key may or may not be less than the physical size of the key. However, the work factor cannot be greater than the physical size of the key. This is because the work factor is dependent only on the amount of secret information in the keys. If the physical size of an encryption key is increased by adding information that is not secret, its work factor is not increased.

Another type of attack relies on advance knowledge, or assumed advance knowledge, of the plaintext of a portion of a message. For example, it may be known that e-mail messages always include certain passages, such as section headings. One seeking to intercept and decrypt such messages could precompute the encrypted form of the known passages, with each possible key and stores both the result for each key and the key itself in a table. Then, if a message is intercepted, the encrypted portion of known context is found in the table, which yields the correct key. This technique is known as a precomputation attack.

Precomputation attack allows intercepted messages to be decrypted relatively quickly and inexpensively, even when the encryption key has a high work factor, but can be foiled by use of a "salt," which will be described in detail below.

On the other hand, the time and expense required to decrypt an intercepted message by the brute force approach depends essentially on the work factor of the encryption key. However, in certain situations, it is necessary to utilize keys having reduced work factors. For example, U.S. law permits the export of cryptographic algorithms or products having a limited key length. For example, certain algorithms may currently be exported if limited to a 40 bit key length. In addition, the laws in certain foreign countries place an upper limit on key length.

BRIEF SUMMARY OF THE INVENTION

It is an object of the present invention to facilitate communication between users, or stations, that operate with keys having different work factors.

A more specific object of the invention is to establish, between two stations, a work factor that can be used by two stations having respectively different work factor capabilities to allow communication between those stations.

The above and other objects are achieved, according to the present invention, by a method for permitting encrypted communications between two stations which are operable with encryption algorithms that accept encryption keys having work factors with respectively different values, comprising:

in a first determining step, determining the lower one of the different work factor values;

providing an initial encryption key having a first work factor value;

comparing the first work factor value with the lower one of the work factors determined in said determining step;

when, in the comparing step, the first work factor value is found to be greater than the lower one of the work factor values determined in said determining step, performing the following steps:

performing a hash function on the initial encryption key to produce a first output, and deriving from the first output a first intermediate key having a work factor value not greater than the lower one of the different work factor values determined in the determining step;

performing a hash function on the first intermediate key to produce a second output, and deriving from the second output a final encryption key having a work factor value not greater than the lower one of the different work factor values determined in said determining step; and using the final encryption key to encrypt communications between the two stations; and when, in the comparing step, the first work factor value is found to not be greater than the lower one of the work factor values determined in the determining step, using the initial encryption key to encrypt communications between the two stations.

Objects according to the invention are further achieved, according to the invention, by a method for permitting encrypted communications between two stations, each of which stations is operable with an encryption algorithm that can accept an encryption key having a given work factor value, comprising:

providing an initial encryption key having a first work factor value which is smaller than the given work factor value of the encryption key that can be accepted by each station;

performing a hash function on a first word that includes the initial encryption key to produce an intermediate key, and deriving from the intermediate key a modified intermediate key having a work factor value which has a greater resistance to precomputation attack than the first work factor value and which is not greater than the given work factor value of the encryption key that can be accepted by each station;

performing a hash function on a second word that includes the modified intermediate key to produce a second output, and deriving from the second output a final encryption key having a work factor value equal to the work factor value of the first intermediate key; and using the final encryption key to encrypt communications between the two stations.

DETAILED DESCRIPTION OF THE INVENTION

Figure 1:
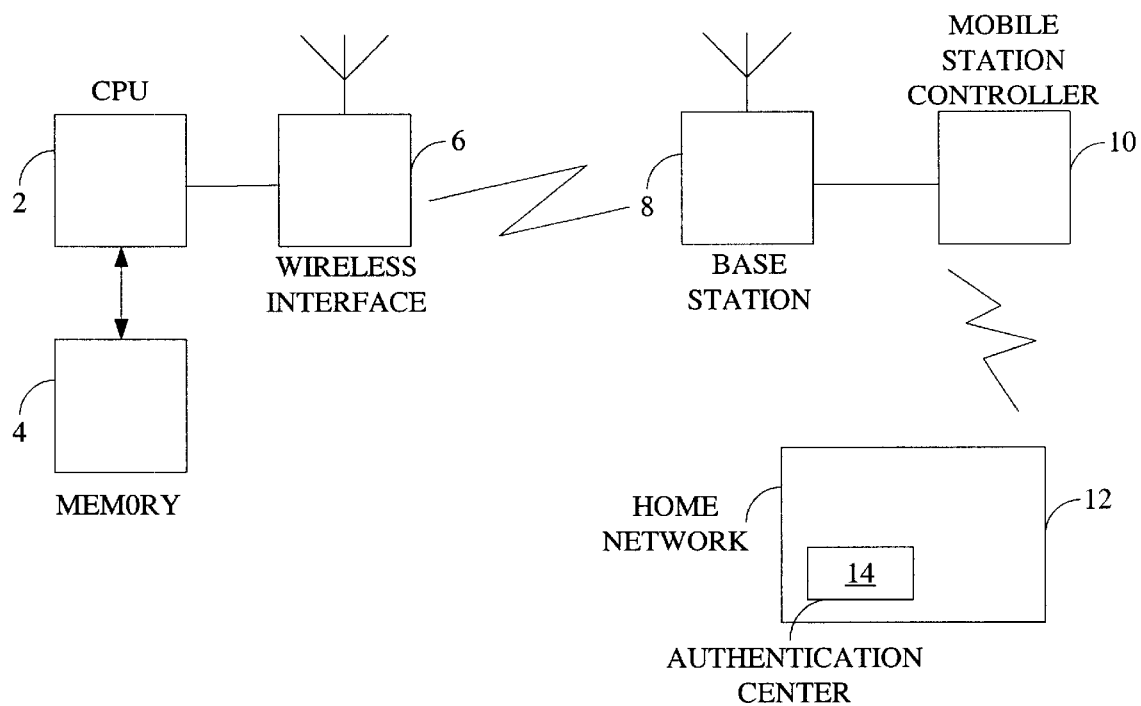
FIG. 1 is a block diagram of a communications system that can be operated according to the process of the present invention.

FIG.1 illustrates the basic components of a mobile communication system to which the invention may be applied. This system includes a plurality of mobile stations, each mobile station being composed essentially of a CPU 2, a memory 4 and a wireless interface 6. All data processing and signal processing are controlled by CPU 2, according to conventional principles in the art. Memory 4 stores data required by the mobile system, including an encryption key, a salt, and other data required for system operation. This data may be permanently stored in memory for or may be written into memory for in response to signals received by interface 6. Interface 6 performs the operations necessary to transmit and receive wireless communications.

The system further includes a base station 8 connected to a mobile station controller 10. Mobile station controller 10 is in communication with a home network 12 that contains, among other things, an authentication center 14. Controller 10 may be coupled to network 12 by a wireless link, a dedicated line, or a communications network. All of the structural components illustrated in FIG. 1 are already known in the art, the basic difference between the known that works in the present invention resides in the manner in which data is encrypted for transmission and decrypted upon reception by an authorized receiving station.

One example of a method according to the invention is set forth herebelow. This method may be performed when communication is to occur between a base station and a mobile station in a cellular network.

The practice of the method according to the invention requires the inputting of the following four items:

a key, K, having a given work factor, $W_k$, which may be too strong for certain uses, as noted above. The mobile station key K is also known to the Authentication Center, and might be transmitted through the telephone switching network to the Base Station, which transmission is presumed secure, so that it is known at both stations. This might be a long term key as used in the North American IS-41 mobile phone system, a temporary key derived from such a long term key, or a temporary key such as is sent in the European GSM system; a word length in bits, $L_c$, of the key that can be accepted by the underlying encryption algorithm; The underlying encryption algorithm could be the above-mentioned DES algorithm, for which $L_c$ is 56 bits, or any other secret key algorithm;

an integer, $W_B$, representing the maximum work factor allowed by the equipment at a selected base station. This integer will be transmitted from the selected base station to a mobile station at some time during setup for a communication between the base station and the mobile station, or it can be deduced from some other information such as a protocol identifier, or protocol version number, that according to procedure known and used in the art, was previously transmitted from the base station to the mobile station when the mobile station entered the area covered by the base station;

an integer, $W_m$, representing the maximum work factor allowed by the mobile station. This may be stored in the mobile station at the time of manufacture, or can be subsequently programmed into the mobile station, subject to the limitation that such programming would be rejected if it constituted an attempt to set a value for $W_m$ which is greater than a value that has already been programmed in the mobile station; and a data item which is known to both the base and mobile stations but is not known in advance to other parties which could intercept a communication between the stations, and which could vary in time and in an manner known only to authorized parties. This is called the "salt", S, and is used to prevent use of precomputed look-up tables to identify the key. The salt could be, for example, the equipment electronic serial number of the mobile station or the RAND value used during the authentication process, or their concatenation. To cite one example, the Electronic Serial Number of a mobile station is currently transmitted at the start of a call, and so it is known to both parties. For a particular phone, it doesn't change over time, but from the point of view of an attacker who is trying to decrypt lots of communications from different people, it changes, so the attacker cannot do precomputation in general. The best the attacker can do would be to precompute for one or more particular phones, and would not be able to intercept communications from other phones; and a one-way function, H, which has the property that it is difficult to invert. In other words, with respect to any output from the function y=H(x), it is computationally infeasible to determine the input value, x, from the output value, y, or to find two input values that produce the same output value. The output value y is commonly known as a hash, and H is commonly known as a hash function. Hash functions of varying strengths are well-known and are commercially available.

One such hash function, known as CAVE, is present in IS-41 standard equipment. Alternatively, the Secure Hash Standard (FIPS 180-1) specifies a function, SHA-1 which could also be used. The input to hash function can have any length. The output of the hash function is assumed to have a number of bits, $L_h$, which is at least as large as the bit numbers representing each of $W_m$, $W_b$ and $L_c$.

Figure 2:
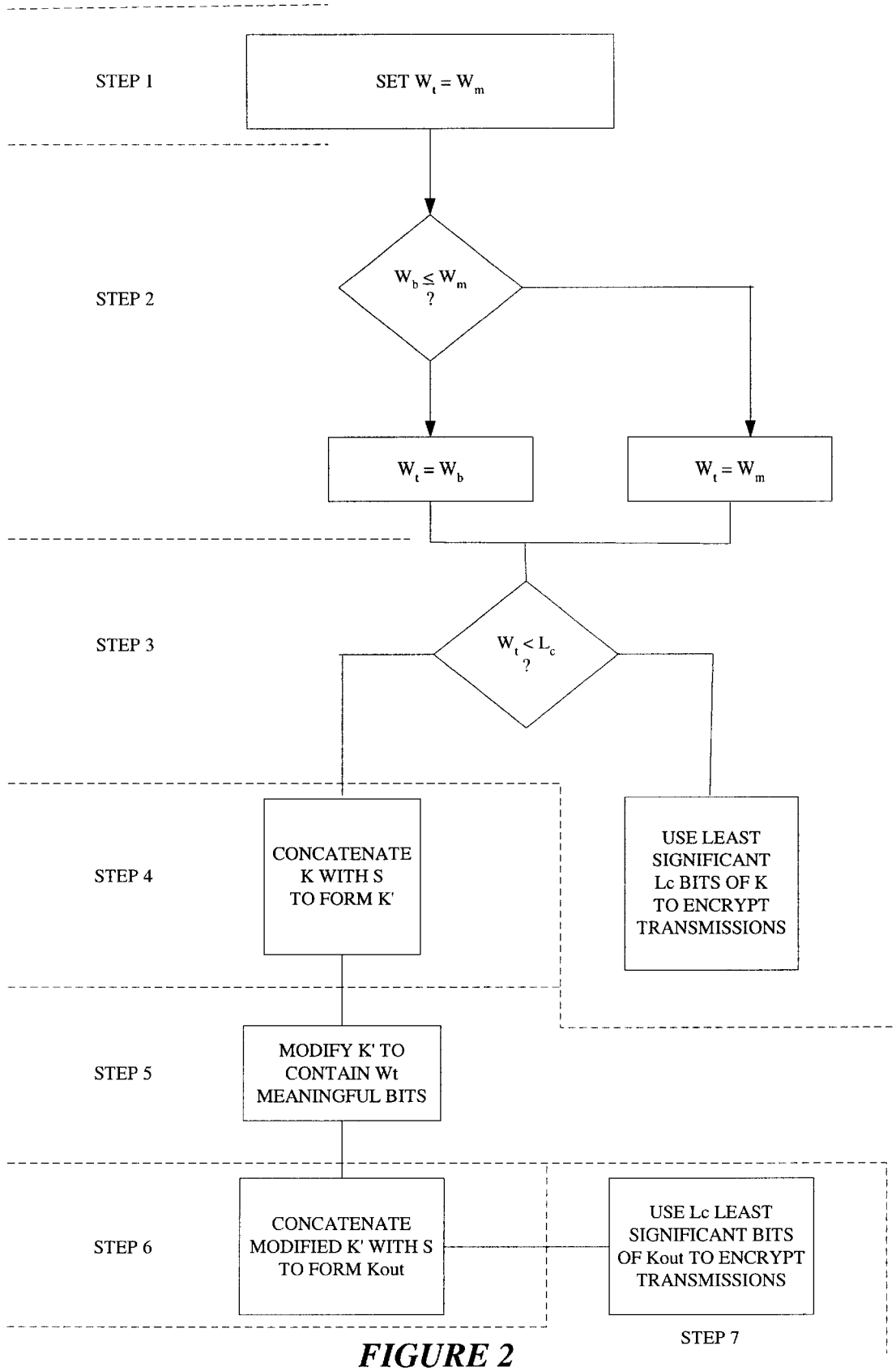
FIG. 2 is a programming flow diagram illustrating one embodiment of the method according to the invention.

One embodiment of a method according to the invention would be composed of the following steps, which are illustrated in the flow diagram of FIG. 2 and are performed in both the mobile station and the base station before an exchange of data can occur:

Step 1

A target work factor, $W_t$, is set to equal the work factor, $W_m$ of a mobile station;

Step 2

The work factor, $W_b$, of the base station is compared with $W_m$; if the comparison indicates that $W_b$ is less than or equal or $W_m$, then $W_t$ is set to be equal to $W_b$. Otherwise, $W_t$ retains the value set in step 1;

Step 3

If the target work factor $W_t$ is greater than or equal to the length of the key accepted by the encryption algorithm $L_c$, the least significant $L_c$ bits of the key K are used directly to encrypt transmissions, and the following steps are omitted. If $W_t$ is less than $L_c$, the following steps are performed to generate a new encryption key.

Step 4

Key K, having the work factor $W_k$, is concatenated with the salt, S, and the resulting word is used as the input to one-way function H. The resulting output is an intermediate key K' having the length $L_h$, but still only a work factor $W_b$ because it is assumed that one seeking to intercept and decrypt a message without authorization knows that salt S.

Step 5

K' is modified to contain only $W_t$ meaningful bits by setting the $(L_h-W_t)$ most significant bits of K' to 0, where $W_t$ has the value produced in steps 1 and 2. The work factor associated with K' has now been reduced to $W_t$ bits.

Step 6

Key K', as modified in step 5, is concatenated with the salt, S, and the resulting word is used as the input to one-way function H to form an output value $K_{out}$.

Step 7

The $L_c$ least significant bits of $K_{out}$ are used as an encryption key K".

Steps 4 through 7 are performed concurrently in both stations.

In the above-described procedure, key K" may have a number of bits greater than the number of bits represented by $W_t$. However, because of the modification of key K' in step 5, key K" will only have the work factor $W_t$, which is not greater than either $W_k$ or $W_h$. Because of the use of salt S in this computation, precomputation attacks would require a greater effort and a larger storage capacity for the table that must be prepared. This effort and storage capacity would correspond to a work factor which is the lesser of $L_c$ or $W_t+L_s$.

Also in the above-described procedure, it is assumed that the same one-way function H is used in steps 4 and 6, and this will normally be done in practice. However, it is possible to use a first one-way function in step 4 and a second one-way function, different from the first one-way function, in step 6.

According to a specific example of the above-described method, initially, key K is generated in a manner which is conventional in the art with a work factor, $W_k$, equal to 64 bits. Use is made of a salt S having a length of 32 bits. In this example, $W_m$ has a value of 64 bits and $W_b$ has a value of 40 bits. Therefore, in step 1 $W_t$ is first set equal to 64 bits and then in step 2 it is set equal to 40 bits.

In this example, DES is the underlying encryption algorithm which has a key length $L_c$ of 56 bits, so that in step 3 $W_t$ is found to be less than $W_c$. Therefore, one proceeds to step 4, which produces K' having a length $L_h$ that is here equal to 160 bits.

In step 5, the 120 most significant bits of key K' are set to zero, so that the resulting modified key K' has 40 meaningful bits and hence a work factor $W_t$ of 40 bits.

The processing performed in step 6 produces an output value $K_{out}$ having a length of 160 bits. Since the underlying encryption algorithm accepts keys of length 56 bits, the least significant 56 bits of $K_{out}$ are used as the encryption key.

According to another embodiment of the invention an encryption key can be converted into a longer key. Both stations must be capable of using the same encryption algorithm, with the same length of key accepted by the algorithm. If this key length is greater than that acceptable to the authorities, the negotiation described above will ensure that the work factor is suitably limited. For example, it may be desired to utilize a cryptographic algorithm capable of accepting a key longer than the key that is initially supplied. In this case, the method according to the invention could be utilized to produce a key having the same work factor. Although this longer factor could be broken by an exhaustive search that is not longer than that required to break the original key, any attempt to precompute results would require a longer calculation and more storage because of the incorporation of the salt.

A method according to this embodiment of the invention would only require that steps 1 and 2 of the first-described embodiment of the invention be changed by setting $W_t$ to the minimum of $W_b$, $W_m$ and $W_k$.

The description presented above relates to the establishment of an encryption key involving only two parties. However, it may occur, in unusual circumstances, that more than two parties are involved in the calculation of the encryption key, although at any given point in the procedure, exchanges would take place between only two of the parties. For example, it may occur that a base station 8 or a mobile station controller 10 is exported from the U.S. and, as a result, had some limit placed on its work factor. It may further occur that a mobile station 2–6 is to be used in France, which composes a greater limit on the work factor. In this case, the method according to the invention could be implemented by having authentication center 14, while communicating with controller 10, arrive at the lower limit imposed by French law. Then, mobile station 2–6 might impose a strength limitation, which it would arrive at by interacting with controller 10. In particular, steps 1–3 would be performed between the home and visited networks to arrive at an acceptable value for $W_b$. This value would then be used by the mobile station and the base station.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for permitting encrypted communications between two stations which are operable with compatible encryption algorithms that accept encryption keys having work factors with respectively different values, comprising:

in a first determining step, determining the lower one of the different work factor values;

providing an initial encryption key having a first work factor value;

comparing the first work factor value with the lower one of the work factor values determined in said determining step;

when, in said comparing step, the first work factor value is found to be greater than the lower one of the work factor values determined in said determining step, performing the following steps:

performing a hash function on a first word that includes the initial encryption key to produce an intermediate key, and deriving from the intermediate key a modified intermediate key having a work factor value not greater than the lower one of the different work factor values determined in said determining step;

performing a hash function on a second word that includes the modified intermediate key to produce a second output, and deriving from the second output a final encryption key having a work factor value not greater than the lower one of the different work factor values determined in said determining step; and using the final encryption key to encrypt communications between the two stations; and when, in said comparing step, the first work factor value is found to not be greater than the lower one of the work factor values determined in said determining step, using the initial encryption key to encrypt communications between the two stations.

2. The method of claim 1 further comprising providing a multi-bit data item constituting a salt, and wherein at least one of the first and second words is a combination of the respective key and the salt.

3. The method of claim 2 wherein each of the first and second words is the combination of the respective key and the salt.

4. The method of claim 3 wherein each of the first and second words is a concantenation of the respective key and the salt.

5. The method of claim 1 wherein the intermediate key has a bit length determined by the hash function and a work factor value equal to the lower one of the different work factors.

6. The method of claim 1 wherein the hash function performed on the first word is identical to the hash function performed on the second word.

7. A method for permitting encrypted communications between two stations, each of which stations is operable with an encryption algorithm that can accept an encryption key having a given work factor value, comprising:

providing an initial encryption key having a first work factor value which is smaller than the given work factor value of the encryption key that can be accepted by each station;

performing a hash function on a first word that includes the initial encryption key to produce an intermediate key, and deriving from the intermediate key a modified intermediate key having a work factor value which has a greater resistance to precomputation attack than the first work factor value and which is not greater than the given work factor value of the encryption key that can be accepted by each station;

performing a hash function on a second word that includes the modified intermediate key to produce a second output, and deriving from the second output a final encryption key having a work factor value equal to the work factor value of the first intermediate key; and using the final encryption key to encrypt communications between the two stations.

8. The method of claim 7 further comprising providing a multi-bit data item constituting a salt, and wherein at least one of the first and second words is a combination of the respective key and the salt.

9. The method of claim 8 wherein each of the first and second words is the combination of the respective key and the salt.

10. The method of claim 9 wherein each of the first and second words is a concantenation of the respective key and the salt.

11. The method of claim 7 wherein the intermediate key has a bit length determined by the hash function performed on the first word and a work factor value equal to the lower one of the different work factors.

12. The method of claim 7 wherein the hash function performed on the first word is identical to the hash function performed on the second word.

* * * * *